US008523647B2

(12) United States Patent
McClintic

(10) Patent No.: US 8,523,647 B2
(45) **Date of Patent: *Sep. 3, 2013**

(54) GAMING METHOD, DEVICE, AND SYSTEM INCLUDING TRIVIA-BASED BONUS GAME

(75) Inventor: Monica A. McClintic, Boulder City, NV (US)

(73) Assignee: IGT, Las Vegas, NV (US)

( * ) Notice: Subject to any disclaimer, the term of this patent is extended or adjusted under 35 U.S.C. 154(b) by 1072 days.

This patent is subject to a terminal disclaimer.

(21) Appl. No.: 11/674,259

(22) Filed: Feb. 13, 2007

(65) Prior Publication Data

US 2007/0129128 A1 Jun. 7, 2007

Related U.S. Application Data

(63) Continuation of application No. 10/028,756, filed on Dec. 21, 2001, now Pat. No. 7,175,521.

(51) Int. Cl.
*A63F 9/24* (2006.01)
*A63F 13/00* (2006.01)

(52) U.S. Cl.
USPC .................................... 463/9; 463/10; 463/16

(58) Field of Classification Search
USPC .................................................. 463/9–11, 16
See application file for complete search history.

(56) References Cited

U.S. PATENT DOCUMENTS 4,487,414 A 12/1984 Karkkainen et al.
4,684,136 A * 8/1987 Turner .......................... 273/271
4,756,532 A 7/1988 Kamille
4,874,173 A 10/1989 Kishishita
5,342,049 A 8/1994 Wichinsky
5,370,399 A 12/1994 Liverance
5,393,057 A 2/1995 Marnell, II
5,423,539 A 6/1995 Nagao
5,431,408 A 7/1995 Adams
5,584,764 A 12/1996 Inoue (Continued)

FOREIGN PATENT DOCUMENTS

WO WO 98/09259 3/1998

OTHER PUBLICATIONS

Mendes, Joaquim, “Banjo-Kazooie Walktrhough/FAQ Version 2.7.2”, Dec. 10, 2000, available at <http://www.gamefaqs.com/n64/196694-banjo-kazooie/faqs/3143>.*

(Continued)

*Primary Examiner* — David Lewis
*Assistant Examiner* — Werner Garner
(74) *Attorney, Agent, or Firm* — Neal, Gerber & Eisenberg LLP

(57) ABSTRACT

A multilevel game includes a base game in which game credits and free passes may be accumulated and saved for play in a bonus event. The bonus event comprises a tic tac toe-like game in which a player is required to correctly answer trivia questions in order to receive a marker in a space of a matrix. Upon correctly answering trivia questions or presenting free passes in lieu of correct answers to trivia questions associated with a prespecified number of spaces in a prespecified arrangement on the matrix, the player may be granted an award or access to a next-higher level of the bonus event. Nonwinners of the bonus event are returned to the base game. Various other features include “double-or-nothing” bonus play. The multilevel game may be effected by a gaming machine or a system that includes a gaming machine.

13 Claims, 13 Drawing Sheets

(56) References Cited

U.S. PATENT DOCUMENTS

| | | | | |
|---|---|---|---|---|
| 5,823,874 | A | 10/1998 | Adams | |
| 5,848,932 | A | 12/1998 | Adams | |
| 5,882,261 | A | 3/1999 | Adams | |
| 5,927,714 | A | 7/1999 | Kaplan | |
| 5,970,143 | A * | 10/1999 | Schneier et al. | 713/181 |
| 6,089,978 | A | 7/2000 | Adams | |
| 6,120,031 | A | 9/2000 | Adams | |
| 6,193,606 | B1 * | 2/2001 | Walker et al. | 463/20 |
| 6,244,958 | B1 | 6/2001 | Acres | |
| 6,312,334 | B1 | 11/2001 | Yoseloff | |
| 6,371,852 | B1 | 4/2002 | Acres | |
| 6,443,452 | B1 | 9/2002 | Brune | |
| 6,494,785 | B1 | 12/2002 | Gerrard et al. | |
| 6,514,141 | B1 | 2/2003 | Kaminkow et al. | |
| 6,569,015 | B1 | 5/2003 | Baerlocher et al. | |
| 6,572,473 | B1 | 6/2003 | Baerlocher | |
| 6,592,454 | B2 | 7/2003 | Libby et al. | |
| 6,599,192 | B1 | 7/2003 | Baerlocher et al. | |
| 6,656,046 | B1 * | 12/2003 | Yoseloff et al. | 463/20 |
| 6,692,355 | B2 | 2/2004 | Baerlocher et al. | |
| 6,719,632 | B2 | 4/2004 | Palmer et al. | |
| 6,722,981 | B2 | 4/2004 | Kaminkow et al. | |
| 6,722,982 | B2 | 4/2004 | Kaminkow et al. | |
| 6,722,983 | B2 | 4/2004 | Kaminkow | |
| 6,755,738 | B2 | 6/2004 | Glasson et al. | |
| 6,758,750 | B2 | 7/2004 | Baerlocher et al. | |
| 6,761,632 | B2 | 7/2004 | Nolz et al. | |
| 6,780,103 | B2 | 8/2004 | Bansemer et al. | |
| 6,786,820 | B2 | 9/2004 | Gerrard et al. | |
| 6,793,579 | B2 | 9/2004 | Baerlocher et al. | |
| 6,796,905 | B2 | 9/2004 | Baerlocher et al. | |
| 6,808,452 | B2 | 10/2004 | Baerlocher et al. | |
| 6,808,454 | B2 | 10/2004 | Gerrard et al. | |
| 6,811,483 | B1 | 11/2004 | Webb et al. | |
| 6,852,027 | B2 | 2/2005 | Kaminkow et al. | |
| 6,852,030 | B2 | 2/2005 | Baerlocher et al. | |
| 6,863,606 | B1 | 3/2005 | Berg et al. | |
| 6,881,146 | B2 | 4/2005 | Anderson et al. | |
| 6,890,257 | B2 | 5/2005 | Baerlocher et al. | |
| 6,899,623 | B2 | 5/2005 | Baerlocher | |
| 6,918,830 | B2 | 7/2005 | Baerlocher | |
| 6,942,566 | B2 | 9/2005 | Baerlocher et al. | |
| 6,960,132 | B2 | 11/2005 | Baerlocher et al. | |
| 6,971,953 | B2 | 12/2005 | Gerrard et al. | |
| 7,040,983 | B2 | 5/2006 | Dolloff et al. | |
| 7,056,210 | B2 | 6/2006 | Bansemer et al. | |
| 7,160,186 | B2 | 1/2007 | Cuddy et al. | |
| 7,175,524 | B2 | 2/2007 | Bansemer et al. | |
| 7,192,349 | B2 | 3/2007 | Baerlocher et al. | |
| 7,235,010 | B2 | 6/2007 | Baerlocher | |
| 7,250,001 | B2 | 7/2007 | Baerlocher et al. | |
| 7,326,114 | B2 | 2/2008 | Webb et al. | |
| 7,326,115 | B2 | 2/2008 | Baerlocher | |
| 7,331,864 | B2 | 2/2008 | Baerlocher et al. | |
| 7,544,129 | B2 | 6/2009 | Baerlocher | |
| 2001/0000118 | A1 * | 4/2001 | Sines et al. | 273/274 |
| 2002/0004424 | A1 * | 1/2002 | Nelson et al. | 463/42 |
| 2002/0022509 | A1 * | 2/2002 | Nicastro et al. | 463/15 |
| 2002/0043759 | A1 | 4/2002 | Vancura | |
| 2002/0142822 | A1 * | 10/2002 | Baerlocher et al. | 463/16 |
| 2003/0036418 | A1 | 2/2003 | Seelig et al. | |
| 2003/0040360 | A1 | 2/2003 | Kaminkow | |
| 2003/0104853 | A1 | 6/2003 | Tessmer et al. | |
| 2003/0114220 | A1 | 6/2003 | McClintic | |
| 2003/0125103 | A1 | 7/2003 | Tessmer et al. | |
| 2004/0106444 | A1 | 6/2004 | Cuddy et al. | |
| 2004/0106446 | A1 | 6/2004 | Cannon et al. | |
| 2004/0116174 | A1 | 6/2004 | Baerlocher et al. | |
| 2004/0162128 | A1 | 8/2004 | Baerlocher et al. | |
| 2005/0032567 | A1 | 2/2005 | Baerlocher et al. | |
| 2005/0037829 | A1 | 2/2005 | Baerlocher et al. | |
| 2005/0101375 | A1 | 5/2005 | Webb et al. | |
| 2005/0101378 | A1 | 5/2005 | Kaminkow et al. | |
| 2005/0130729 | A1 | 6/2005 | Baerlocher et al. | |
| 2005/0181853 | A1 | 8/2005 | Baerlocher | |
| 2005/0266914 | A1 | 12/2005 | Baerlocher et al. | |
| 2006/0003837 | A1 | 1/2006 | Baerlocher et al. | |
| 2006/0040724 | A1 | 2/2006 | Baerlocher et al. | |
| 2006/0205474 | A1 | 9/2006 | Bansemer et al. | |
| 2007/0129133 | A1 | 6/2007 | Bansemer et al. | |
| 2007/0155466 | A1 | 7/2007 | Baerlocher et al. | |

OTHER PUBLICATIONS

"Grunty's Furnace Fun", printed from the internet on May 17, 2012, available at <banjokazooie.wikia.com/wiki/Grunty%%027s_Furnace_Fun>.*

Description of Let's Make a Deal Television Show written by letsmakeadeal.com (2 pages), printed on Mar. 16, 2001.

Jeopardy Advertisements written by IGT, published prior to Dec. 2001.

Let's Make a Deal written by geocities.com (10 pages), printed on Mar. 21, 2001.

Let's Make a Deal written by fortunecity.com (4 pages), printed on Mar. 21, 2001.

Let's Make a Deal written by Illinoislottery.com (1 page), printed on Mar. 21, 2001.

Let's Make a Deal geocities.com (2 pages), printed on Mar. 16, 2001.

Let's Make a Deal game advertisement written by Bally Gaming Systems, published in 1999.

Monopoly advertisements and articles written by WMS Gaming, Inc., Strictly Slots, published in 1998, 1999, 2000.

Full specification as filed in U.S. Appl. No. 10/005,213, including claims and drawings.

Full specification as filed in U.S. Appl. No. 10/029,384, including claims and drawings.

Full specification as filed in U.S. Appl. No. 10/039,228, including claims and drawings.

**TIC-TAC-DOUGH, materials from Internet (printed Mar. 18, 2002 and Mar. 15, 2002, earlier dates in document).

**The Hollywood Squares, materials from Internet (printed Apr. 25, 2002, earlier dates in document).

* cited by examiner

GAMING METHOD, DEVICE, AND SYSTEM INCLUDING TRIVIA-BASED BONUS GAME

This application is a continuation of U.S. Application No. 10/028,756, filed Dec. 21, 2001, which is hereby incorporated by reference in its entirety in the present application.

BACKGROUND OF THE INVENTION

1. Field of the Invention

The present invention relates generally to methods, apparatus, and systems for gaming and, more specifically, to methods, apparatus, and systems for effecting a trivia-based bonus game.

2. State of the Art

Gaming machines, such as so-called "slot" machines, have long been a significant facet of the gaming industry. The most basic implementation of a slot machine is a mechanical device with multiple vertically spinning reels. The reels are invoked to spin as a player pulls a lever of such a slot machine. When the reels stop at random positions, a symbol or combination of symbols appears along at least one "pay line" to indicate winning of credits, money, or another award. The probabilities and predetermined payout for all winning possibilities are controlled to provide a desired or legal "house percentage" of the total monies played.

Video versions of gaming machines have become increasingly popular in recent years, and include fully computerized machines and hybrid machines that include both mechanical and electronic components and which may be referred to as "electromechanical" machines. Continuing with the slot machine example, many video slot machines include a computer-generated depiction of multiple reels, which simulate the mechanical reels of conventional, mechanical slot machines. Play of electronic gaming machines, such as video slot machines, video blackjack machines, video poker machines, and the like, is typically effected by way of one or more processors of such machines under control of software programs which include random number generators (RNGs), which assure a truly random result. Thus, a game may have a statistically sound basis for achieving desired verifiable payout levels for both experienced and inexperienced players.

A current, widespread enhancement to conventional single game gaming machines is the addition of a "bonus" or secondary game or event, which typically occurs if a player achieves at least one selected outcome during play of the underlying base or primary game. Many bonus events are retrofitted as so-called "top boxes" to conventional, single game gaming machines, in which the preexisting game comprises the base game, thus enhancing player appeal with respect to play of the games of gaming machines that are already in service.

In many cases, the bonus game is a singular event, in that play on the gaming machine switches from the base game to the bonus game when a certain base game outcome is achieved, the bonus game then being played to completion. Examples of this type of bonus game, wherein the bonus games are variously configured, are described in U.S. Pat. Nos. 5,823,874, 5,848,932, 5,882,261, and 6,089,978, all of which have been assigned to Anchor Gaming, assignee of the present invention. Progressive games, wherein a portion of wagers is allocated to fund a jackpot, have also been embodied as bonus games. A notably successful example of a so-called "linked progressive", wherein gaming machines are linked for purposes of contributing to the award from a bonus event won at one of the linked gaming machines, is the WHEEL OF FORTUNE bonus game, which is based upon the aforementioned '874 and '932 Patents.

In the WHEEL OF FORTUNE game, players are notified of the various events in the game through visual indicators such as flashing lights, computer-generated text images in the display, and audible indicators such as theme music playing. Specifically, a player is notified that he or she has won a chance at the bonus event by seeing the symbol appear in the display screen, flashing of a "Spin the Wheel" button on the gaming machine housing and playing of the WHEEL OF FORTUNE game theme. When the player pushes a button labeled "Spin the Wheel", the bonus wheel spins and sounds of the wheel spinning are generated. When the wheel stops and indicates an award, the sound of audience applause is generated. All of the foregoing elements are intended to enhance the player's gaming experience and to attract other players to the game.

In card games, so-called "wild" cards may be used by a player in lieu of any other particular card to form a winning hand. A wild card must be played in the hand in which it is dealt or drawn. Thus, if a wild card will not form a winning hand with the player's other cards, it is of no benefit to the player.

In U.S. Pat. Nos. 5,431,408 and 6,120,031, both to Adams, a gaming machine is disclosed as using a conventional card game, e.g., poker, but operating with the proviso that wild cards dealt in one game, or "hand", may be reserved for use in future games. Thus, a player having a "hand" which is little helped by a wild card may save the card for a future hand, where a wild card may enhance the winnings.

Various techniques are used in the gaming industry for attracting players to a gaming machine and maximizing the enjoyment experienced while playing a particular game. Such techniques include, for example, enhanced audio and visual effects, changes in game format during play (e.g., bonus games), frequency of winning indicia combinations, and the like.

Conventional gaming machines, including the bonus games thereof, typically execute games of chance which do not require a player to strategize or use any mental skill.

Nonetheless, there is a need for games and gaming machines that cause a player to exercise his or her mental skills. Such games may prolong and enhance interaction between a primary or base game and any bonus games, thus maintaining a high level of entertainment value and personalization of the bonus gaming experience. Providing a gaming device with elements of chance as well as skill at a plurality of interacting levels would be attractive for many players at all levels of experience.

BRIEF SUMMARY OF THE INVENTION

The present invention includes a gaming method with discrete levels of play, as well as gaming units and systems by which play of the game of the present invention may be effected. A gaming unit incorporating teachings of the present invention may be configured as a "stand-alone" game, i.e., not connected to a network of other gaming devices for cooperative play, competitive play or linked progressive play. The present invention also includes gaming units that are networked or otherwise communicate with one another.

The game includes a first, base game, or level of play, in which credits, money, or other awards are given based on certain prespecified outcomes in a game of chance, such as the reel combinations of symbols in slot machines, the card "hands" in poker and blackjack, and the like. In addition, upon the occurrence of one or more prespecified events in the base game, play may proceed to a bonus event, in which the player may make additional wagers and receive additional awards. Moreover, during play of the base game, it may be possible to obtain items that are useful for the bonus event. Again, the occurrence of one or more prespecified events, which may be the same as or different from the prespecified events that result in entry to the bonus event, may be required for a player to obtain such items. Alternatively, such items may be "purchased" during play of the base game with a prespecified number of game credits.

By way of example and not to limit the scope of the present invention, the base game may be any game which may be incorporated into a gaming device, including, but not limited to, simulated card games, lotto, keno, "slots", and the like. Randomly awarded prizes include conventional game credits, which may be "cashed-in" for money, as well as items that are useful during play of the bonus event and may be saved for future use therein.

In a bonus event according to the present invention, a player is required to respond to trivia questions, with bonus awards being provided for correct responses to one or more of the trivia questions.

In an exemplary embodiment of the bonus event, a display of a "tic tac toe" (i.e., a 3×3 matrix) or other matrix (e.g., a 4×4 matrix, a 5×5 matrix, a three-dimensional matrix (e.g., a 3×3×3 cube matrix), etc.) is presented. At least some of the "spaces" of such a matrix are filled with trivia subjects or topics from which questions may be randomly drawn. The trivia subjects or topics may be selected by a player of the bonus event or randomly determined. The player may be required to answer questions in a prespecified number of linearly arranged adjacent spaces (e.g., a "row") or other prespecified locations in order to receive an award or the option to continue to a next-higher level of the bonus event. If the player answers the question properly or presents a "free pass", which may have been obtained during play of the base game, a marker, such as an "X", is placed in the appropriate space of the matrix. Otherwise, the player loses the opportunity to position a marker in that particular space.

An award may be provided to the player for each correct answer. When all of the questions have been correctly or incorrectly answered without correct answers being in a prespecified arrangement (e.g., a row, four corners, four spaces arranged in a square, etc.), play returns to the base game and may continue at that level. If, on the other hand, the correct answers are given in the first level of the bonus event at spaces in a prespecified arrangement, the player may be provided with an additional bonus award or provided with an option to proceed to another, higher level of the bonus event.

As an example, in a 3×3 matrix, different topics may be randomly assigned to six of the nine spaces, with the player being required to answer questions selected from three spaces that are arranged in a line, or "row", along the matrix correctly before finishing the bonus event or being provided with an opportunity to proceed to a next-higher level of the bonus event. Upon selecting a space and its associated trivia topic, a trivia question relating to that topic is presented to the player. If the player provides the correct answers to questions selected from three spaces in a row (i.e., horizontally, vertically, or diagonally adjacent) along the matrix, the player may be given an award or provided with the option of proceeding to a next-higher level of the bonus event.

In embodiments of the present invention where the bonus event includes multiple levels, each level may include a tic tac toe game similar to that of the first level of the bonus event. The player is again presented trivia questions and a choice of answers for each of six subjects within a tic tac toe matrix. Play at the second level of the bonus game may require the player to answer trivia questions that have been selected from topics different from those that were presented during the first level of the bonus event, or questions that are deemed to be harder than those of the previous bonus event level. Correct answers to the trivia questions or use of a "free pass" may result in the player receiving awards. In one embodiment, completion of a prespecified arrangement of spaces, such as a tic tac toe line, in the secondary bonus game results in a doubling of the bonus award won by the player. The game may include a "double or nothing feature" wherein failure to complete a prespecified pattern of spaces on the matrix results in loss of credits won at the secondary bonus level.

A gaming apparatus of the present invention may be adapted for use with a player tracking card, such as a so-called "smart card", for recording the player's progress level in the game, "free passes" collected, and game credits, thereby making that player's game settings and resources portable. Thus, a player may exit a game and re-enter it later on the same or different game machine, starting at the same progress level at which the game was earlier exited. As a result, the player may avoid forfeiture of free passes or a particular level of play that has been achieved, or leave such to another player.

A gaming machine of the invention may be connected to an accounting and gaming information system operatively coupled to a central server computer. The system may include a player tracking module and a pit, cage and credit system for providing automated casino transactions.

The gaming machine may include a single processor or group of processors that effect play of the base game and the bonus game, or may be a hybrid unit including an existing gaming machine on which the base game may be played and an ancillary "top box" installed on the gaming machine to add the possibility for play of the bonus event to the existing gaming machine.

It is contemplated that the game of the present invention may be implemented with a bank of networked gaming machines and further contemplated that the game may be implemented as a linked progressive game among a plurality of networked gaming machines at a single site or plurality of different sites.

Many versions of the gaming device and play methods are possible by changing the game "rules", payout table, difficulty of questions and the like. The gaming device may be configured to permit a player to choose a particular version or difficulty level for playing. The payout table may be varied in accordance with the degree of challenge of the questions to be answered.

BRIEF DESCRIPTION OF THE SEVERAL VIEWS OF THE DRAWINGS

The nature of the present invention as well as other embodiments thereof may be more clearly understood by reference to the following detailed description of the invention, to the appended claims, and to the several drawings herein, wherein:

FIGS. 4, 5, 6, 6A and 7 together form a flow chart of an exemplary embodiment of a base/bonus/secondary bonus implementation of a game of the present invention, wherein:

FIGS. 4 and 5 are flow charts for a base or primary game;

FIG. 6 is a flow chart for a primary bonus game event;

FIG. 6A is an alternative flow chart for a primary bonus game; and

FIG. 7 is a flow chart for a secondary bonus game event;

DETAILED DESCRIPTION OF THE INVENTION

Figure 1:
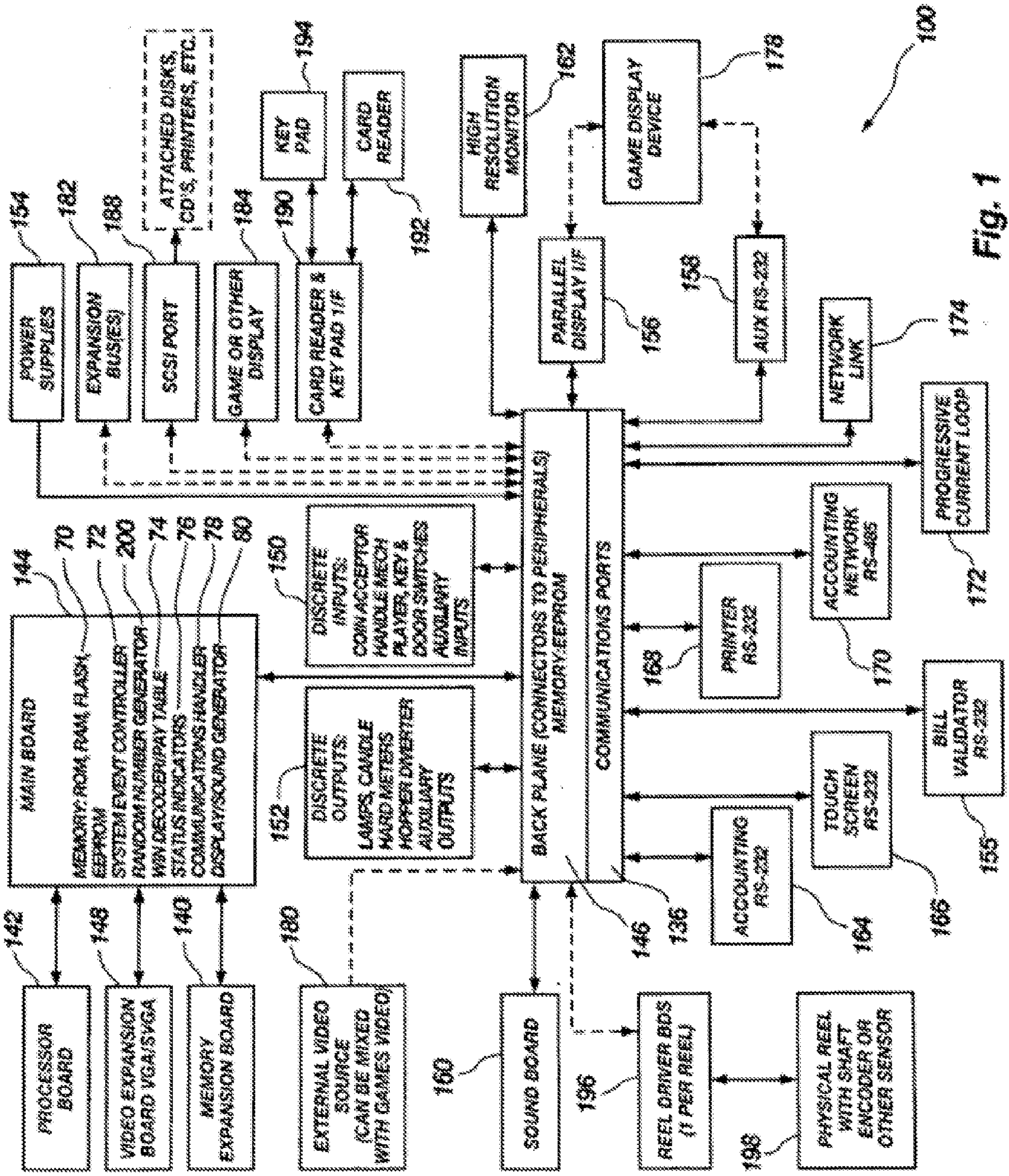
FIG. 1 is a schematic block diagram of an exemplary gaming machine architecture suitable for use in implementing the present invention.
Figure 1A:
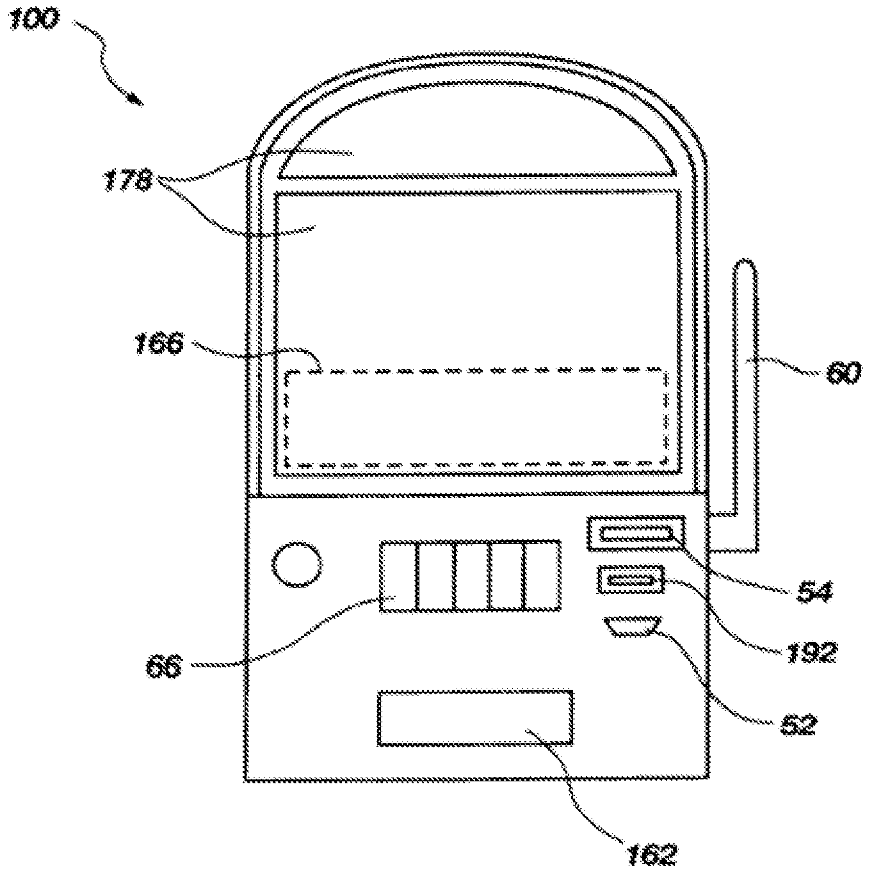
FIG. 1A is a front view of an exemplary gaming machine suitable for embodying a multilevel game of the present invention.

FIG. 1A depicts the exterior of a gaming machine 100 of the invention. Within the gaming machine 100 but not shown in FIG. 1A are a central processing unit and memory associated therewith. The gaming machine 100 is shown as including two upper game display devices 178 and a coin return 162. Coins or tokens may be inserted in coin acceptor 52 and added to the game credits that are available on the gaming machine 100. Similarly, currency may be inserted in bill receiver/validator 54 to increase the number of available game credits.

Optionally, or as an alternative to the coin acceptor 52 and bill receiver/validator 54, the gaming machine 100 may include a card reader 192 configured to at least partially receive a player card that stores account information personal to the card holder and, possibly, other gaming information. The card reader 192 is configured to retrieve information stored on such a player card and may be configured to alter the information stored on the card or to store additional information on the card. The card reader 192 communicates information, such as the amount of money available in an account associated with the player card, to the processor, which may then cause (e.g., by contacting a remotely located computer with which the account is associated or by storing information on a computer chip on the player card) an amount of money selected by the player, if available, from the account for the purchase of game credits on the gaming machine 100.

A player may take action, such as selecting the amount of money to be withdrawn from an account, the wager amount for each game played, and actions associated with one or more games to be played on the gaming machine by way of play input controls 66 of the gaming machine 100, such as the illustrated buttons or a touch screen 166 of one of the game display devices 178, in which the player touches icons that are presented to provide the central processing unit with desired input. Alternatively, a play handle 60 of the gaming machine 100 may be pulled to initiate play, instead of using a play input control 66 or a touch-sensitive screen 166.

In use and operation, and referring to FIG. 1, gaming machine or device 100 includes a memory expansion board 140, a processor board 142, a main board 144 and a back plane 146 integrally or separately formed. Memory expansion board 140 as well as processor board 142, including a graphics system processor and video expansion board VGA/SVGA 148, are operably coupled to the main board 144. The main board 144 preferably includes memory 70 in the form of ROM, RAM, flash memory and EEPROM (electrically erasable programmable read only memory). In addition, the main board 144 includes a system event controller 72, a random number generator 200, a win decoder/pay table 74, status indicators 76, a communications handler 78 and a display/sound generator 80.

The main board 144 is operably coupled to the back plane 146, which may include additional memory, such as in the form of an EEPROM, and connectors to connect to peripherals. Furthermore, the back plane 146 provides a plurality of communication ports 136 for communicating with external peripherals. The back plane 146 provides the coupling between discrete inputs 150 and the processor board 142 and main board 144. Typical examples of elements that provide discrete inputs 150 are coin acceptors, game buttons, mechanical hand levers, key and door switches and other auxiliary inputs. Furthermore, the back plane 146 provides the coupling between discrete outputs 152 and the processor board 142 and main board 144. Typically and by way of example only, elements that provide discrete outputs 152 are in the form of lamps, hard meters, hoppers, diverters and other auxiliary outputs.

The back plane 146 also provides connectors for at least one power supply 154 for supplying power for the processor board 142, a parallel display interface (PDI) 156 and a serial interface 158 for game display device 178. In addition, the back plane 146 also provides connectors for a sound board 160 and a high-resolution monitor 162. Furthermore, the back plane 146 includes communication ports for operably coupling and communicating with an accounting network 164, a touch screen 166 (which may also serve as a game display device), a bill validator 155 incorporated in a currency (bill) acceptor, a printer 168, an accounting network 170, a progressive current loop 172 and a network link 174.

The back plane 146 optionally includes connectors for external video sources 180, expansion buses 182, game or other displays 184, an SCSI port 188 and an interface 190 for at least one card reader 192 (debit/credit, player card, etc.) and key pad 194. The back plane 146 may also include means for coupling a plurality of reel driver boards 196 (one per reel) which drive physical game reels 198 with a shaft encoder or other sensor means to the processor board 142 and main board 144 if a gaming device 100 is configured for play of a reel-type game. Of course, the reels may be similarly implemented electronically by display as video images, technology for such an approach being well known and widely employed in the art. In such an instance, reel driver boards 196 and physical game reels 198 with associated hardware are eliminated and the game outcome generated by the random number generator 200 on main board 144 is directly displayed on a video game display 184 and, optionally, on a separate game display device 178, as known in the art. Other gaming machine configurations for play of different wagering games such as video poker games, video blackjack games, video Keno, video bingo or any other suitable primary games are equally well known in the art. It will also be understood and appreciated by those of ordinary skill in the art that selected components of gaming device 100 may be duplicated for play of a bonus game or event in accordance with the present invention, in that at least a separate board with a second random number generator may be employed, with associated peripherals and links thereto, for play of the bonus game. In the conventional situation wherein the bonus game of the present invention may be operably coupled as a "top box" or otherwise associated with a conventional, existing gaming machine configured for play of a base game, many of the components illustrated in FIG. 1 and described with respect thereto will be duplicated, including separate software and associated memory for conducting play of the bonus game with associated pay tables for the bonus awards.

It will also be understood and appreciated by those of ordinary skill in the art that selected components of gaming device 100 may be duplicated for play of a bonus game or event in accordance with the present invention, in that at least a separate board with a second random number generator may be employed, with associated peripherals and links thereto, for play of bonus games.

In implementation of a stand-alone version of the present invention, orchestrated audio and visual effects that are both attractive and dynamic in nature, are provided by software in the main board 144 and appropriate hardware. The atmosphere that is created by full-motion video animation with sound provides for exciting and enjoyable play and attracts the attention of others, particularly during play events. During idle periods, such effects may be continued, and include the audio-visual effects of reel spins, winning sequences, and the like.

Figure 2:
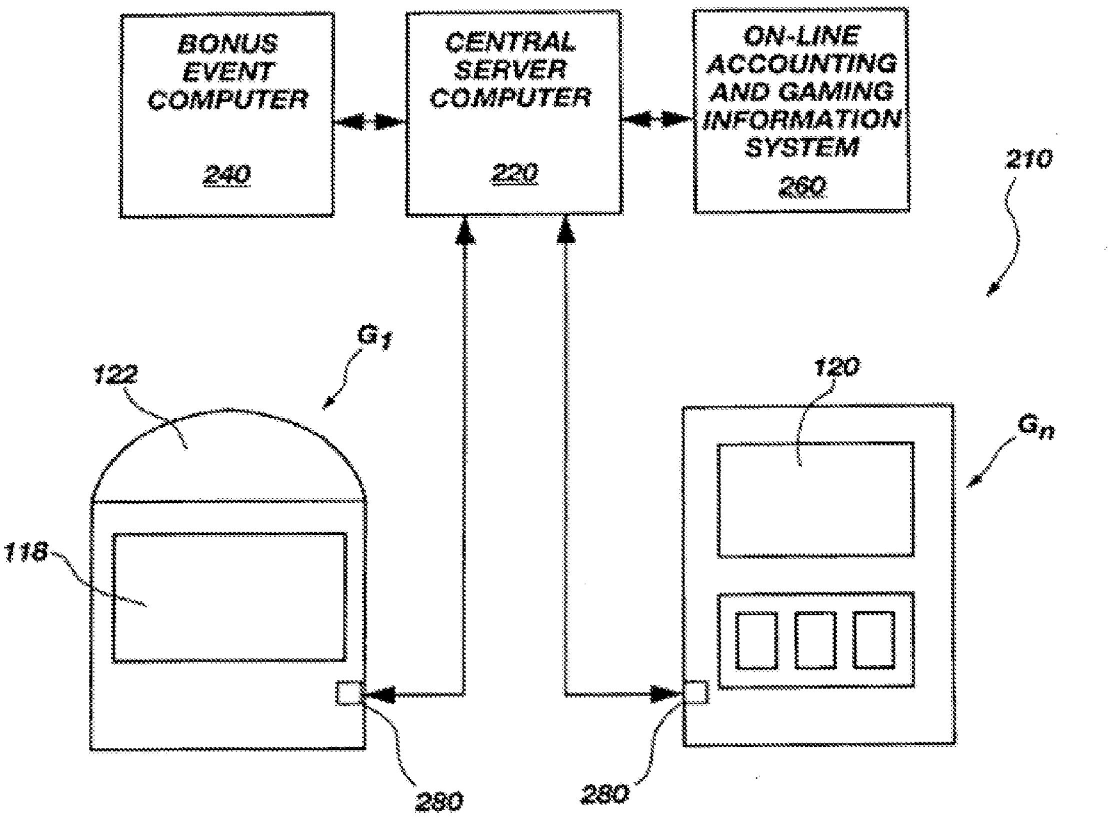
FIG. 2 is a schematic block diagram of a configuration in which gaming machines are connected to a central server computer.

In implementation of the present invention, the gaming machines offering play of the bonus event of the present invention may be employed, as schematically depicted in FIG. 2, in a gaming network 210 that includes a central server computer 220 operably coupled to a plurality of gaming machine $G_1, G_2 \ldots G_n$ which may include both electronic and reel-type game machines. It is notable that, unless the gaming network 210 is configured for progressive play, a variety of different makes of gaming machines $G_1, G_2 \ldots G_n$ offering widely different games may be incorporated in gaming network 210, since the bonus event operates independently of the primary game on each gaming machine. The central server computer 220 automatically interacts with a plurality of gaming machines $G_1, G_2 \ldots G_n$ to activate a bonus event.

More specifically, and again referring to FIGS. 1 and 2, the gaming network 210 includes a central server computer 220, a bonus event computer 240 and a plurality of gaming machines $G_1, G_2 \ldots G_n$. Each gaming machine $G_1, G_2 \ldots G_n$ includes a controller assembly 280 operably coupled to the central server computer 220 and comprised of a controller unit designed to facilitate transmission of signals from each individual gaming machine $G_1, G_2 \ldots G_n$ to central server computer 220 for monitoring purposes. In addition, the controller assembly 280 includes a network interface board fitted with appropriate electronics for each specific make and model of each individual gaming machine $G_1, G_2 \ldots G_n$.

Referring to FIG. 2, in electronic video games, the central server computer 220 is operably coupled to at least one video game display element 118, as shown at the left-hand side of FIG. 2, and sequesters a portion of the video game display element 118 for displaying video attract sequences to attract potential players. Video game display element 118 may be used for display of both the primary and bonus games. Where the gaming network 210 includes reel-type gaming machines $G_1, G_2 \ldots G_n$, as shown at the right-hand side of FIG. 2, the central server computer 220 may be operably coupled to at least one active display element 120 so that potential players receive a clear indication of attract sequences and the active display element 120 may be used as a video display for the bonus game. As shown at the left-hand side of FIG. 2, the gaming machines $G_1, G_2 \ldots G_n$ may also be provided with a second video display element 122 as an alternative to sequestering a portion of the video game display element 118 for displaying video attract sequences and the bonus game. In addition, the central server computer 220 may include sound-generating hardware and software for producing attractive sounds orchestrated with the video attract sequences at each of gaming machines $G_1, G_2 \ldots G_n$ if such is not already incorporated therein. The games support input and output between the player and the games for such devices as heads-up display, joystick, keyboard, mouse and data glove via interface modules connected through the expansion bus or buses 182 and SCSI port 188.

The attractive multimedia video displays and dynamic sounds may be provided by the central server computer 220 by using multimedia extensions to allow gaming machines $G_1, G_2 \ldots G_n$ to display full-motion video animation with sound to attract players to the machines. During idle periods, the gaming machines $G_1, G_2 \ldots G_n$ preferably display a sequence of attraction messages in sight and sound. The videos may also be used to market specific areas of the casino and may be customized to any informational needs.

Furthermore, the gaming network 210 includes bonus event computer 240 operably coupled to the central server computer 220 for scheduling bonus parameters such as the type of bonus game, pay tables and players. The functions of central server computer 220 and bonus event computer 240 may, of course, be combined in a single computer. Preferably, the gaming network 210 further includes a real-time or on-line accounting and gaming information system 260 operably coupled to the central server computer 220. The accounting and gaming information system 260 includes a player database for storing player profiles, a player tracking module for tracking players and a pit, cage and credit system for providing automated casino transactions.

Figure 3:
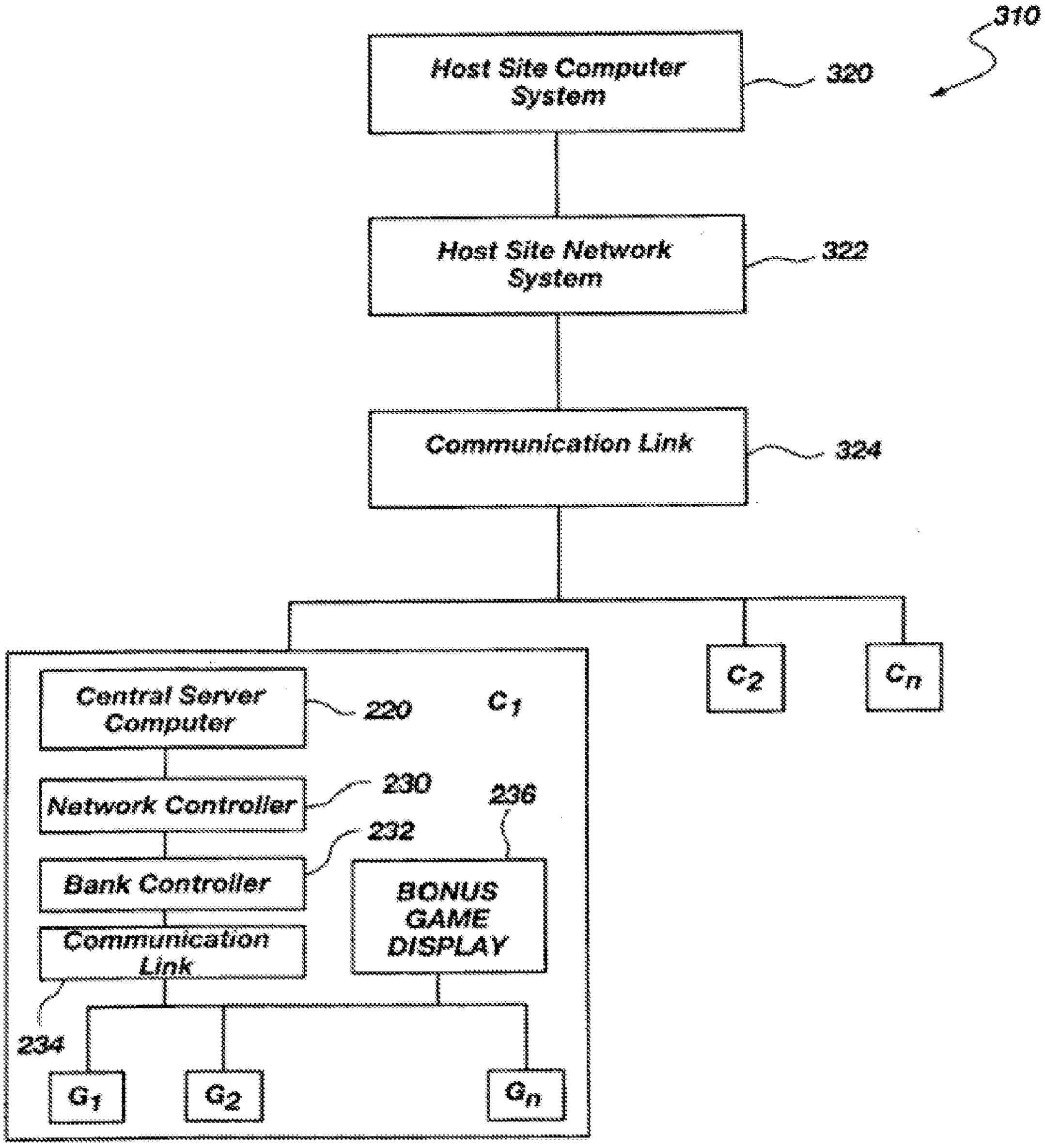
FIG. 3 is a schematic block diagram of a gaming system including a central server computer and a plurality of gaming devices remote therefrom and in communication therewith.

As previously implied, a bank of gaming machines $G_1, G_2 \ldots G_n$ may be networked together in a progressive configuration, as known in the art, wherein a portion of each wager to initiate a primary game may be allocated to bonus event awards. In addition, and referring to FIG. 3, a host site computer 320 is coupled to a plurality of the central server computers 220 at a variety of mutually remote casinos or other gaming sites $C_1, C_2 \ldots C_n$ for providing a multi-site linked progressive automated bonus gaming system 310.

Preferably, the host site computer 320 will be maintained for the overall operation and control of the bonus gaming system 310. The host site computer 320 includes a host site computer network 322 and a communication link 324 provided with a high-speed, secure modem link for each individual casino site $C_1, C_2 \ldots C_n$.

Each casino or other gaming site $C_1, C_2 \ldots C_n$ includes the central server computer 220 provided with a network controller 230 which includes a high-speed modem operably coupled thereto. Bidirectional communication between the host site computer 320 and each casino site central server computer 220 is accomplished by the set of modems transferring data over communication link 324.

A network controller 230, a bank controller 232 and a communication link 234 are interposed between each central server computer 220 and the plurality of networked gaming machines at each casino site $C_1, C_2 \ldots C_n$. In addition, the network controller 230, the bank controller 232 and the communication link 234 may optionally be interposed between each central server computer 220 and at least one separate display 236 at each casino site $C_{1,\ C2} \ldots C_n$. However, the bonus gaming system 310 may include hardware and software to loop back data for in-machine meter displays to communicate with bonus event award insert areas on gaming machines $G_1, G_2 \ldots G_n$.

In the present invention, gaming proceeds on more than one level or mode. Thus, during play of a base game 10 (FIG. 4), opportunities to play a bonus event 20 may be randomly awarded. In the bonus event or game 20, correct answers to trivia questions are required for winning. The questions are randomly drawn from trivia subjects or topics 94 which are associated, by random selection, with particular spaces 92 of a matrix 90, such as the tic tac toe matrix depicted in FIGS. 8-11. The bonus event 20 may include multiple levels, in which case each bonus level 20A, 20B . . . 20*n* of the bonus event 20 of the invention utilizes a matrix 90 of game spaces 92, such as the squares depicted in FIGS. 8-11.

Figure 1B:
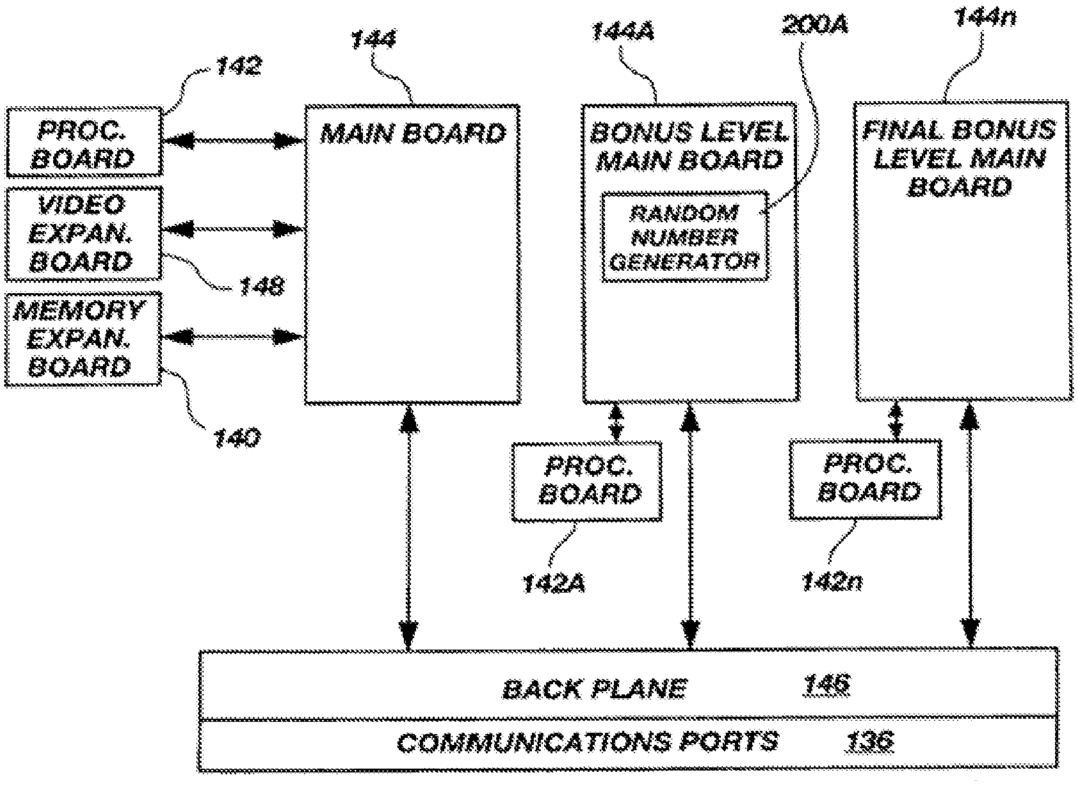
FIG. 1B is a schematic block diagram of a portion of a gaming machine suitable for use in implementing a multilevel game of the invention.

Selected components of gaming device 100 may be used to effect play of such a bonus event, as shown in FIG. 1B. Thus, for example, a first bonus level 20A may utilize a second main board 144A with its own random number generator (RNG) 200A and a connected second processor board 142A. The second main board 144A is connected to the back plane 146 and to peripherals through communications ports 136. The random number generator 200A on the second main board 144A is used to select various game parameters during bonus play.

Additional bonus play levels 20*n* may be enabled by use of additional main boards 144*n* and processor boards 142*n*. Any number of bonus levels may be used, but the example described herein uses two bonus levels in addition to the base game 10 play level.

It will also be understood and appreciated by those of ordinary skill in the art that instead of a separate board for each level of play, a single enhanced main board 144 may include all of the required board elements for operating a base game as well as a multilevel bonus game.

In implementation of a stand-alone version of the present invention, orchestrated audio and visual effects, which are both attractive and dynamic in nature, are provided by software in the main board(s) 144, 144A . . . 144*n* and appropriate hardware. The atmosphere which is created by full-motion video animation with sound provides for exciting and enjoyable play and attracts the attention of others, particularly during play of the bonus event. During idle periods, such effects may be continued and include the audio-visual effects of reel spins, winning sequences, and the like.

As shown in FIGS. 8-11, the game parameters selected by random number generator 200A include the random positioning of player-selected or randomly selected trivia subjects or topics 94 on at least some spaces 92 of matrix 90. Trivia topics 94 may be placed in all of the spaces 92 of matrix 90, or in a predetermined number of randomly selected spaces 92, such as the six spaces 92 depicted in FIGS. 8-11.

Upon selecting a space 92 of a matrix 90 that contains a trivia topic 94, a trivia question that pertains to that trivia topic 94 is randomly selected. Each trivia question is presented to a player along with a plurality of possible answers, only one of which is the correct answer to the presented trivia question. For example, a trivia question displayed on the game display device 178 (FIG. 1A) may be: "Who is buried in Grant's Tomb?" and a player must choose from three answers which are displayed:

A. Grantland Rice

B. Small Business Grant

C. U. S. Grant

As an alternative to presenting possible answers in a multiple-choice format, at least some of the trivia questions may be presented in a "true/false" format and, thus, the possible answers may be presented simply as "TRUE" and "FALSE".

A pay table for correct answers in bonus play may follow any hierarchy which is consistent with the limitations of the gaming machine 100 and the gaming environment. Thus, for example, for a 3×3 matrix 90 in which six trivia topics 94 are displayed and, thus, in which six trivia questions may be presented, an exemplary pay table may be:

| | |
|---|---|
| First correct answer | 1 for 1 |
| Second correct answer | 2 for 1 |
| Third correct answer | 5 for 1 |
| Fourth correct answer | 10 for 1 |
| Fifth correct answer | 25 for 1 |
| Sixth correct answer | 500 for 1 |

Alternatively, a fixed award amount may be provided for each correct answer.

In addition, completion of a pattern 98 of a predetermined number of spaces 92 in which the trivia questions have been correctly answered by the player, such as the depicted line of three spaces 92 with correct answers, will provide the player with an additional bonus award and/or passage to a subsequent bonus level 20B, 20C . . . 20*n* of the bonus event 20. This may be true if the pattern 98 (e.g., the depicted line) is completed on the third, fourth, fifth or sixth play at the bonus level 20A, 20B . . . 20*n*. Alternatively, the rules of the bonus event 20 may require a player to correctly answer all of the trivia questions that appear in the spaces 92 of matrix 90 to successfully complete a particular bonus level 20A, 20B . . . 20*n*. Play at each subsequent bonus level 20B, 20C . . . 20*n* may be effected in substantially the same fashion.

Figure 8:
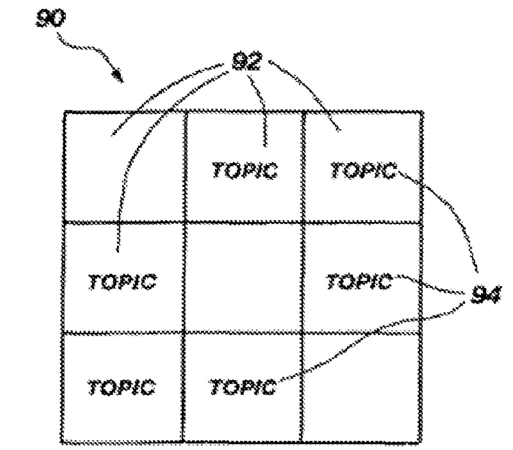
FIGS. 8, 9, 10 and 11 are schematic illustrations of a tic tac toe matrix display in which various possible random assignments of topics to matrix squares are shown.
Figure 9:
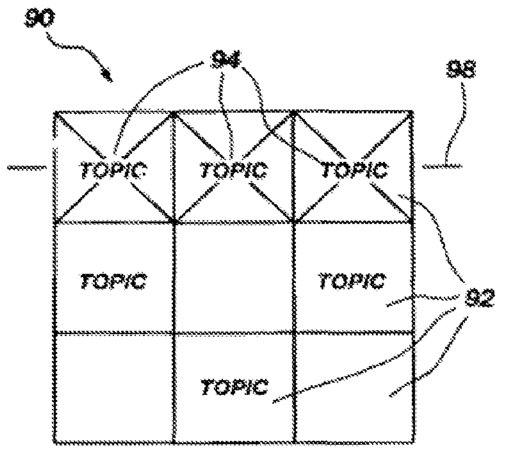
Figure 10:
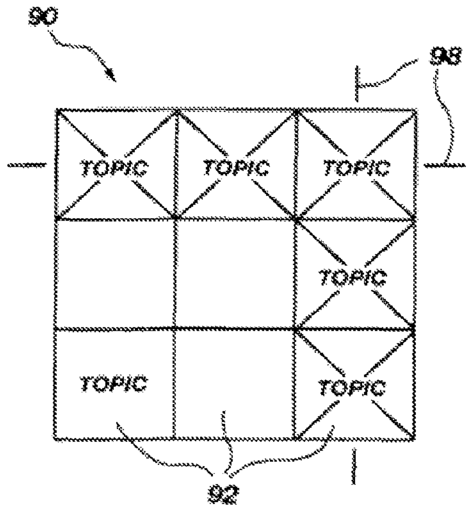
Figure 11:
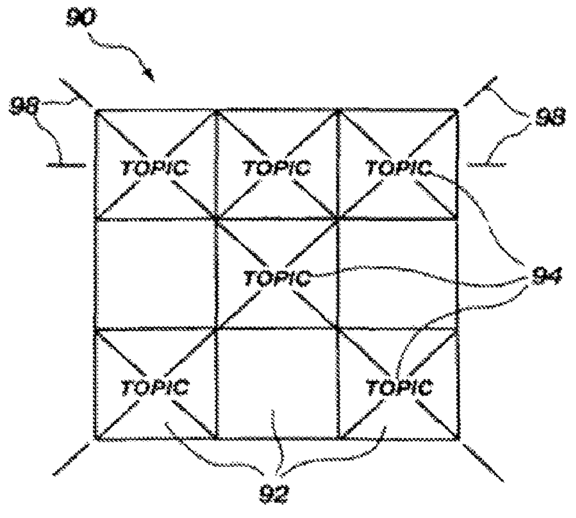

As noted in FIGS. 8-11, random assignment of six selected topics 94 to six spaces 92 of a 3×3 matrix 90 may result in the following possibilities for achieving a pattern 98 (e.g., the depicted line) of correctly answered questions:

(a) No straight lines 98 of topic-filled squares 92, as shown in FIG. 8;

(b) One straight line 98 of topic-filled squares 92, as shown in FIG. 9;

(c) Two straight lines 98 of topic-filled squares 92, as shown in FIG. 10; and (d) Three straight lines 98 of topic-filled squares 92, as shown in FIG. 11.

Thus, random presentation of the matrix 90 of FIG. 8 may not permit a player to advance to the next level of play, even if all questions are correctly answered. In FIGS. 9-11, exemplary patterns are shown for presenting possibilities for one, two or three lines 98 of correct answers. It is known, of course, that, as the number of possible winning combinations of a given number of topics is increased, a player's odds of winning increases.

Referring now to FIGS. 4, 5, 6 and 7, which together form a flow chart of an exemplary sequence of events for play of the gaming machine 100 shown in FIGS. 1, 1A and 2, FIGS. 4 and 5 show the play sequence for an exemplary base game 10. The interfaces between FIGS. 4, 5, 6 and 7 are indicated by circled letters A, B, C, D, etc.

A player begins play of the base game 10 on gaming machine 100 by first, at step 406, obtaining one or more game credits on gaming machine 100 (FIGS. 1 and 1A), for example, by introducing cash into the machine via a coin acceptor 52 (FIGS. 1 and 1A), a bill receiver/validator 54 (FIGS. 1 and 1A) or by transferring money from an account associated with a player card inserted into a card reader 192 (FIGS. 1 and 1A). The numbers of game credits and free passes that have been purchased and/or accumulated on the gaming machine 100 are displayed at step 420, and the player is prompted to wager a quantity of credits.

The player may then select a number of game credits to wager at step 408. The game may have a minimum wager (typically, one coin or credit) and a maximum wager (typically ranging from three to ten or more credits). The wager is decremented from the player's total to update the player's account, and the player prompted to initiate play of the base game 10 (e.g., "spin" the "reels" of a slot machine or have cards in a poker or blackjack game dealt).

At step 410, the player initiates play of the base game 10 (e.g., by pressing a button 66 (FIGS. 1 and 1A) with a label such as "play" or "deal", touching a similarly labeled icon on a video touch screen 166 (FIGS. 1 and 1A), pulling play handle 60 forward, or by other means, as available on the gaming machine 100).

Figure 4:
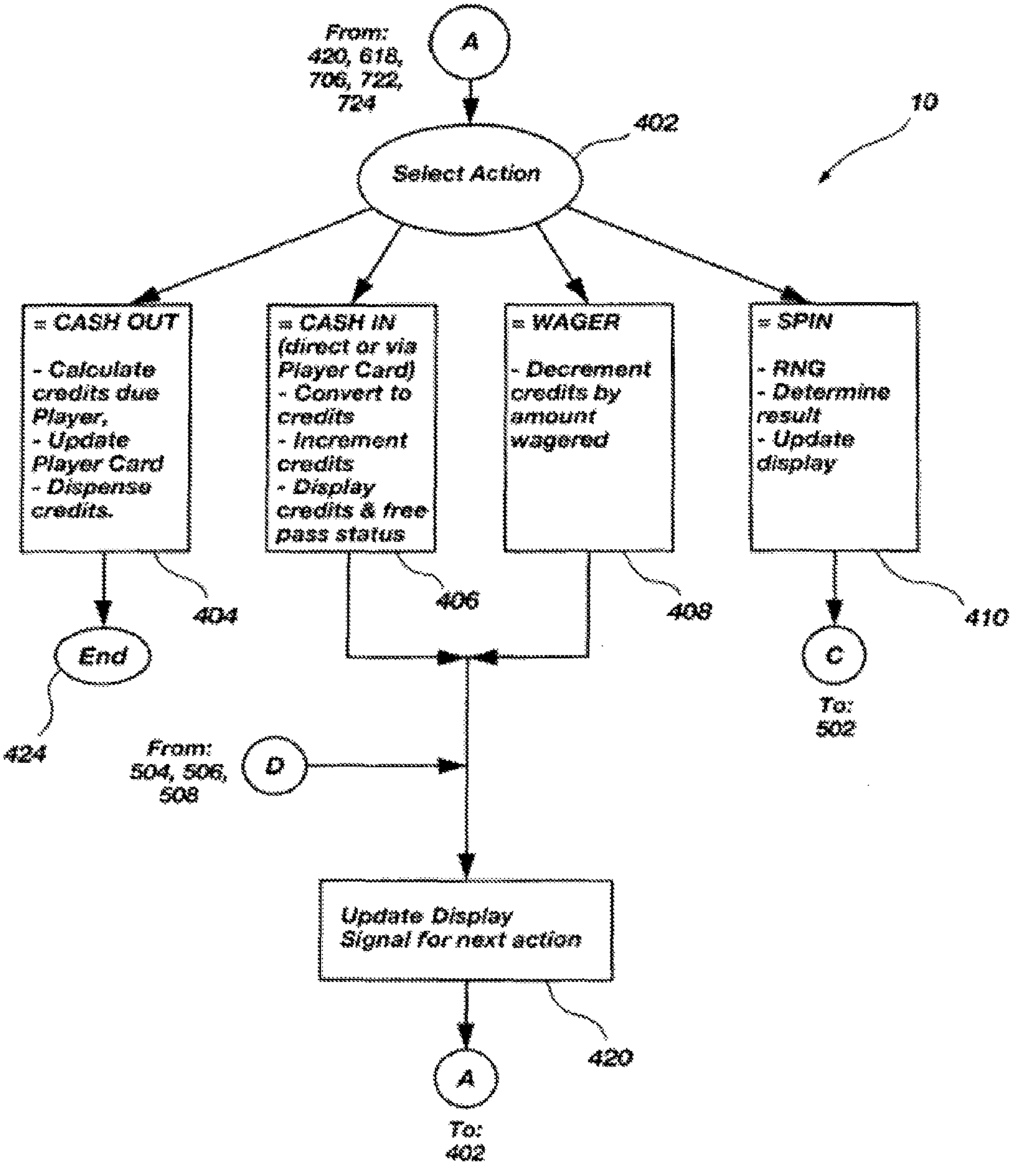
Figure 5:
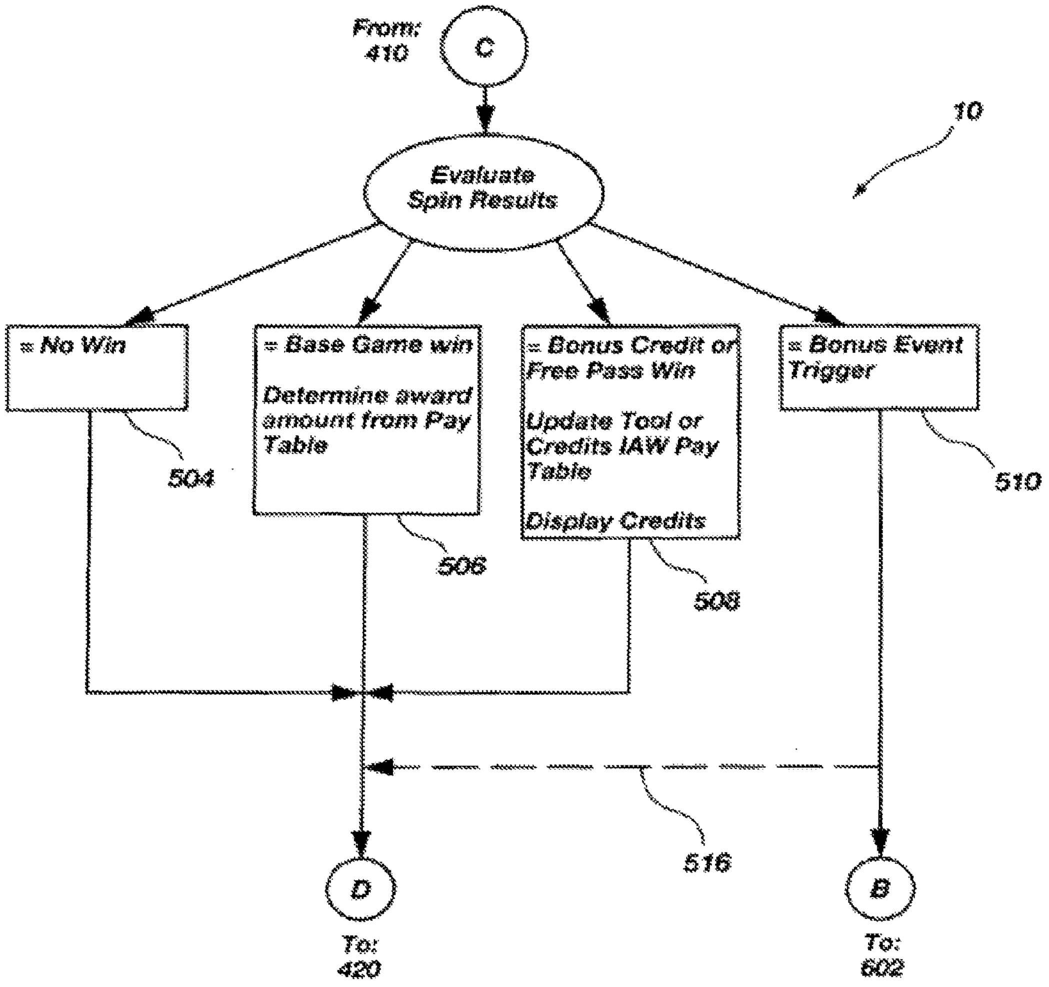

Turning now to FIG. 5, the result of the base game 10 (FIG. 4) may be categorized by:

(a) No Win, at reference character 504, in which the player's account is updated at step 420 of FIG. 4 and the player is prompted to repeat step 410 of FIG. 4;

(b) Base Game Win, at reference character 506, in which winnings of game credits are calculated from the pay table described below. Payouts of any game credit winnings may be roughly proportional to the number of game credits that were wagered at step 408 of FIG. 4 and are incremented to the total number of game credits that have accumulated on the gaming device 100 (FIGS. 1 and 1A);

(c) Bonus Credit or Free Pass Win, at reference character 508, in which one or more free passes may be won and saved for use during play of the bonus event 20. The free passes are incremented to the player's account and displayed; or (d) Bonus Event Trigger, at reference character 510, in which the result of the base game 10 moves play to the bonus event 20.

In a gaming machine 100 having a plurality of mechanical reels 198 (FIG. 1), the wager and play initiation results in spinning of the reels, the stopping places of which determine an outcome which may include winning of game credits and/or "free passes" and/or entry into a bonus event 20. In an electronic video version of gaming machine 100, random number generator 200 determines the outcome relating to game credits, free passes, entry into a bonus event 20, etc. A predetermined pay table lists the payout for various play results and amounts wagered. As an example, where the base game 10 is a video 5-card draw poker game with a minimum wager of one credit (e.g., 10 cents, 25 cents, one dollar, etc.), a pay table may be as follows:

Payout:

| | |
|---|---|
| Pair of Jacks or better | 1 for 1 |
| Two Pairs | 2 for 1 |
| Three of a Kind | 3 for 1 |
| Straight | 4 for 1 |
| Flush | 5 for 1 |
| Full House | 8 for 1 |
| Four of a Kind | 25 for 1 |
| Straight Flush | 50 for 1 |
| Royal Flush | 500 for 1 |

The payout may be configured to be affected by the amount wagered. For example, an additional award may be granted for wagering the maximum permissible number of credits (e.g., five credits, an additional 10%, etc.). Alternatively, additional awards may be provided in gradually increasing amounts, depending upon the probability of the outcome, the number of credits wagered, or some combination thereof.

"Free passes", which permit a player to skip a trivia question while indicating in the space 92 of the matrix 90 in which the trivia question appeared that the player has provided a correct answer thereto or which may provide the player with another trivia question that is randomly selected from a group of trivia questions related to the trivia topic 94 that appears in the selected space 92, may be randomly awarded during play of the base game 10. Alternatively, the player may pay a prespecified amount or redeem a prespecified number of game credits to purchase a "free pass" and/or pass on a trivia question, or to be provided with an alternate trivia question at a particular space 92 of the matrix. "Free passes" may also be awarded (randomly or upon correctly answering trivia questions) or purchased during play of the bonus event 20.

In a first embodiment of the game, occurrence of the Bonus Event Trigger, at reference character 510, during play of the base game 10 automatically initiates play of the bonus game 20. In an optional embodiment illustrated in FIG. 5, a player may reject automatic entry into the bonus event 20 and, at reference character 516, return play to the base game 10. As an example, a player may wish to win more free passes in the base game 10 before entering the bonus event 20, or may simply choose to cash out his or her remaining game credits, at step 404 of FIG. 4. A player may choose to cash out at step 404 of FIG. 4 at any time during play of the base game 10 or bonus event 20 to recover all of the game credits that remain on the gaming machine 100 (FIGS. 1 and 1A). If a player is using a player card or so-called "smart card", he or she may also recover and save not only the free passes, but also his or her position in the game. Thus, the current game can be exited and re-entered at a later date, and even on a different gaming machine 100 having the same configuration. In the event that a large number of game credits have been accumulated on a gaming machine 100, the gaming machine 100 may optionally print and issue a voucher to the player, which may be redeemed by the casino or other gaming administrator responsible for the gaming machine 100. The gaming machine 100 then decrements the numbers of game credits and free passes to zero.

Figure 6:
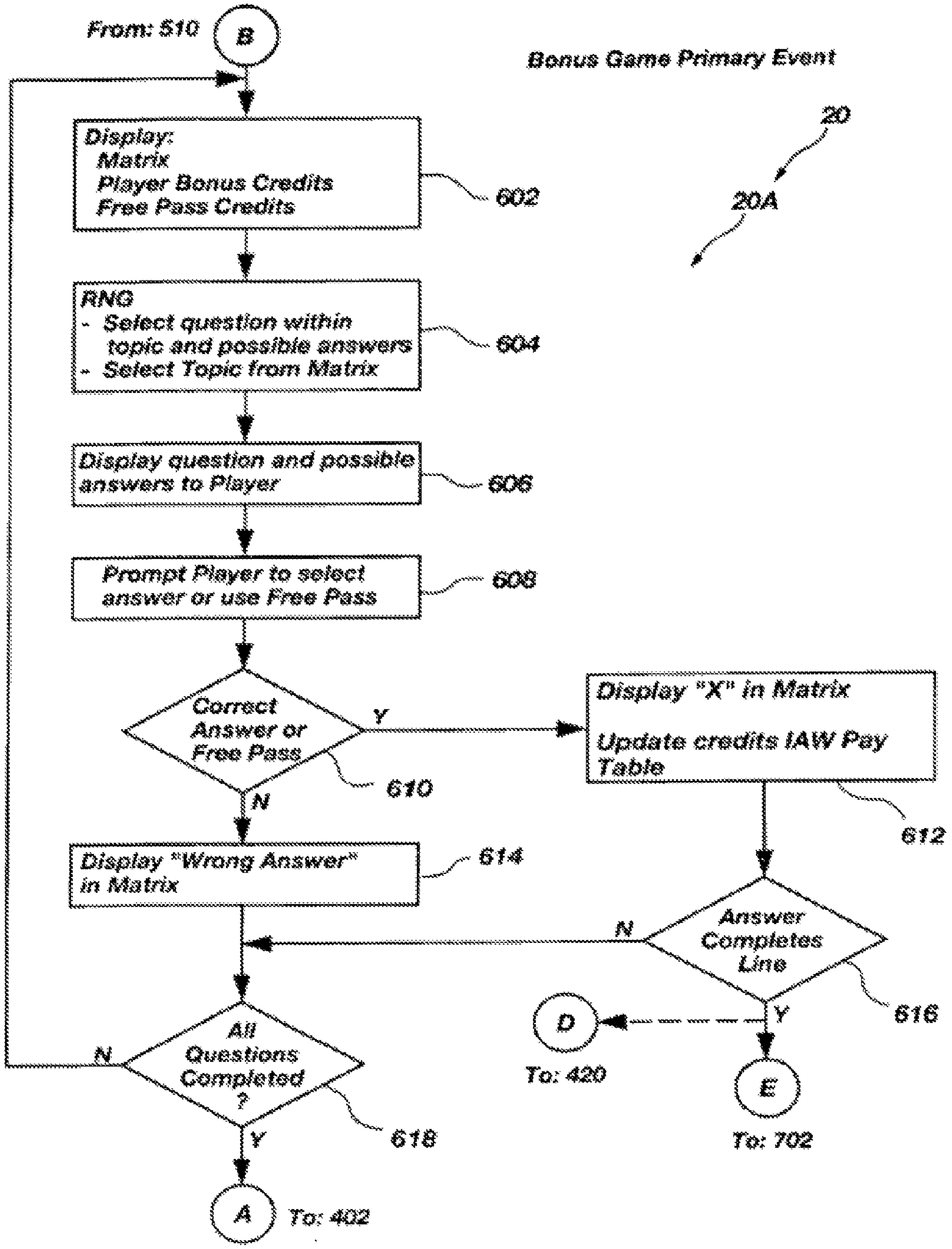

FIG. 6 depicts the process of playing a first level 20A of an exemplary bonus event 20. In this bonus event 20, a matrix 90 is displayed at step 602, having a 3×3, 4×4 or 5×5 matrix of spaces 92. In addition, the player's game credits and number of free passes may be displayed.

Figure 13:
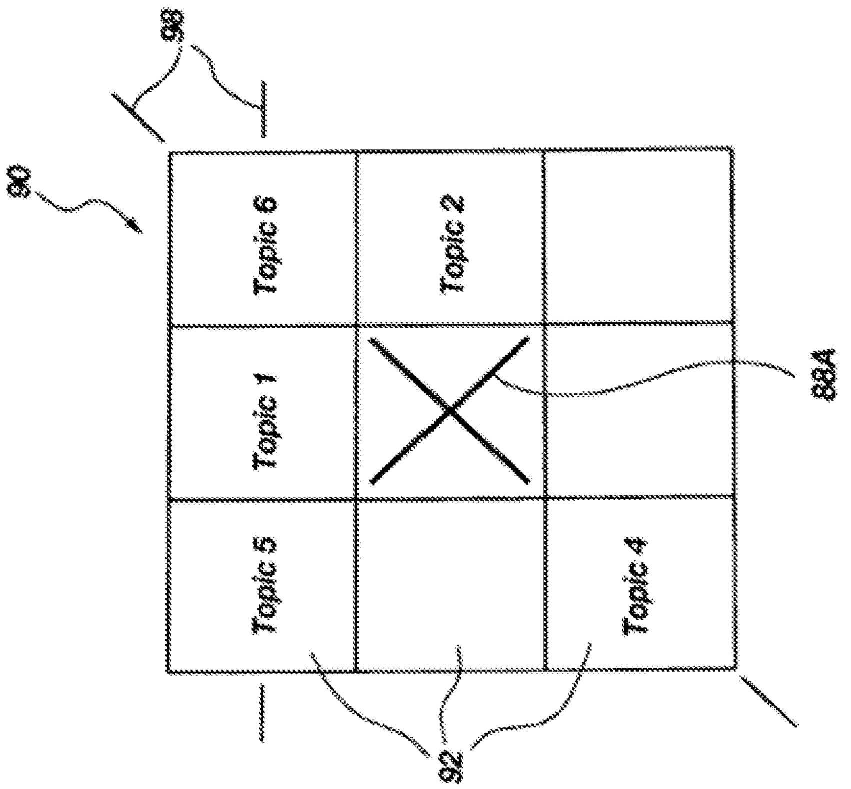
FIGS. 12, 13, 14 and 15 are schematic illustrations of a tic tac toe matrix display in a bonus play level showing the effect of sequentially answering questions relating to six topics in one exemplary embodiment of a game of the present invention.
Figure 12:
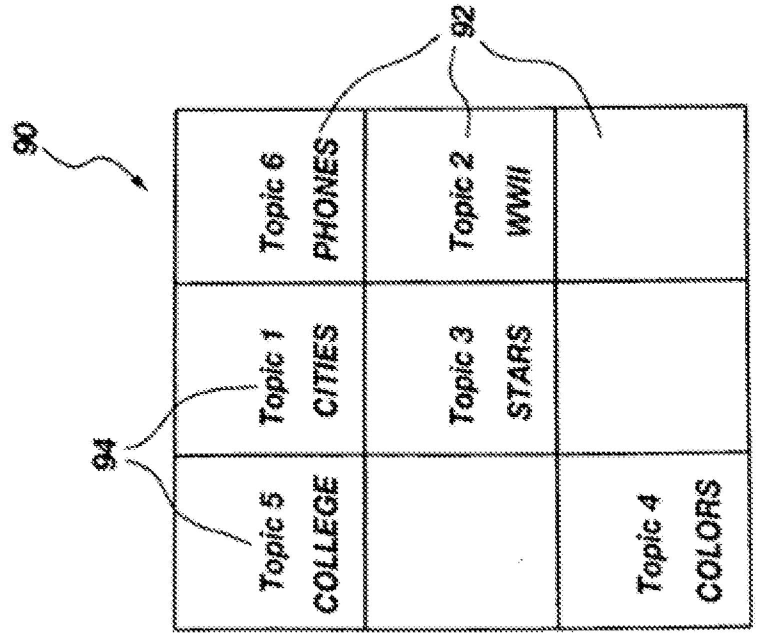

In this description, a 3×3 matrix 90 will be utilized for illustrating the device and game. A large number of trivia topics 94 with a large number of preselected, associated trivia questions are stored in memory 70 (FIG. 1) of the gaming device 100. At step 604, the random number generator 200 (FIG. 1) of the gaming device 100 is activated to select six trivia topics 94, each of which is randomly assigned to one of the nine spaces 92 of the matrix 90. Thus, six spaces 92 are topic-filled and provide 0, 1, 2, or 3 straight three-space lines 98 in which trivia topics 94 are displayed, depending upon the results of the random assignment. In addition, at step 606, a trivia question related to one of the trivia topics 94 is displayed, together with a plurality of possible answers, including at least one correct answer 88A (FIG. 13). The player is prompted to select an answer at step 608.

If a player selects the correct answer at step 610, a correct answer indicium 88A (FIG. 13) that indicates that a correct answer has been chosen, shown as an X, is displayed in the proper space 92 of the matrix 90 and a corresponding number of game credits may be awarded at step 612. An incorrect answer indicium 88B (FIG. 14) comprising, for example, the words "Wrong Answer", is shown at step 614 if an incorrect answer is chosen. If a player does not know or is unsure of which answer is the correct answer to a trivia question that has been presented in connection with a particular space 92 and the player has purchased or been awarded a "free pass", the "free pass" may be redeemed in place of the correct answer.

Once a trivia question has been answered, the player may be prompted to play the next trivia topic 94, unless correct answers have been presented for the appropriate, preselected number of spaces 92 in the required, prespecified arrangement, for example, three spaces 92 in a row or line 98, as determined at step 616. In that case, play may proceed, at step 702, to a subsequent bonus level 20B, 20C . . . 20*n*. Alternatively or in addition, the player may be granted an additional bonus award for successfully completing a level 20A, 20B . . . 20*n* of the bonus event 20.

A player who has attained entry into the bonus event may opt to return to play of base game 10, at step 420 of FIG. 4, attempt to obtain one or more free passes to use in the bonus event 20, or cash out at step 404 and exit the game at step 424. In the event that a player successfully completes the bonus event 20, play returns, at step 618, to the base game 10 at step 402 of FIG. 4.

Figure 6A:
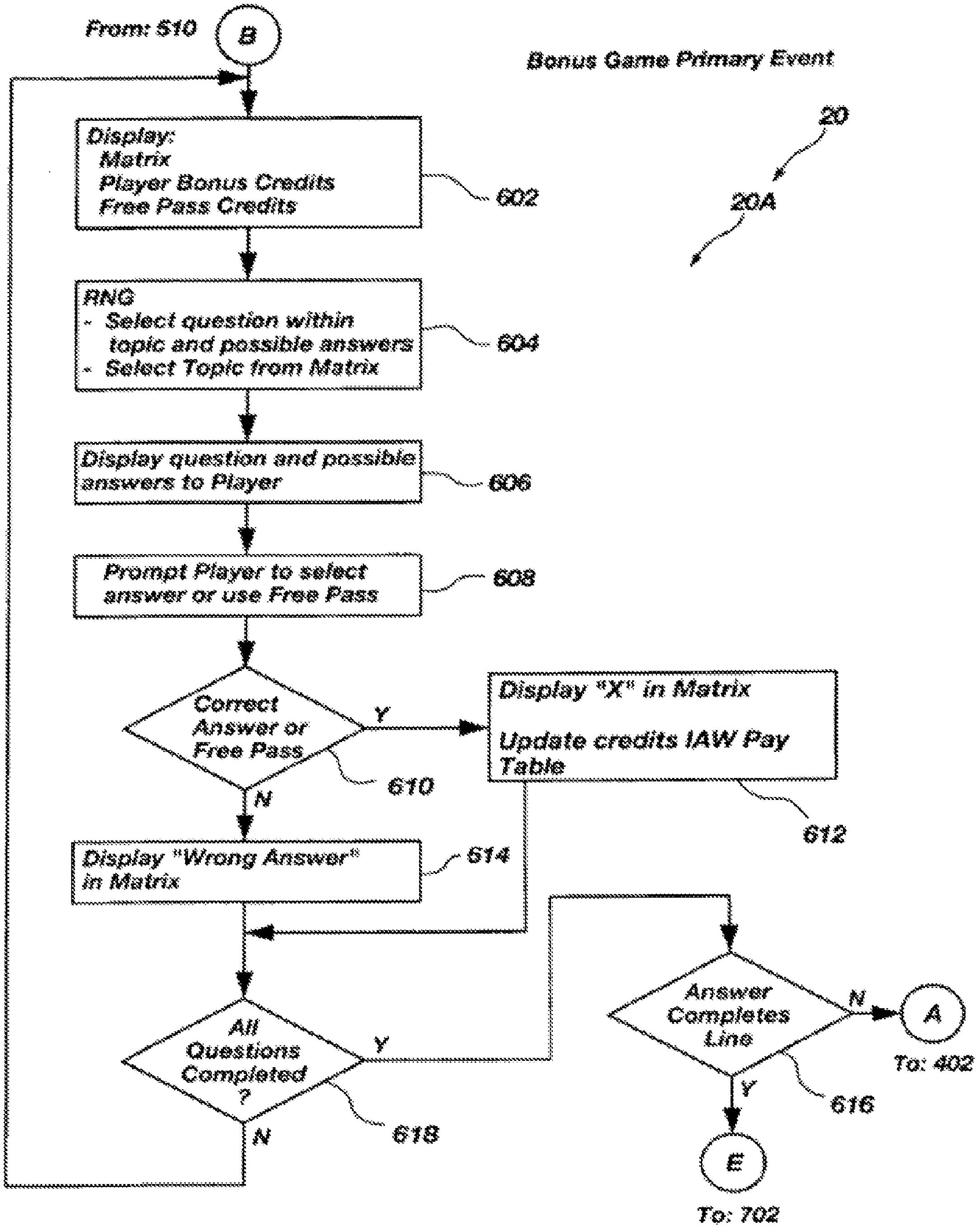

FIG. 6A is an alternative flow chart for the bonus event 20. As shown, trivia questions relating to each of the presented trivia topics 94 must be answered (correctly or incorrectly) to complete play of the bonus event 20. If, after answering all of the trivia questions that are presented, all of the spaces 92 of at least one prespecified pattern 98 (e.g., a three-space line) are filled with correct answer indicia 88A, play of the bonus event 20 may proceed to a subsequent level 20B, 20C . . . 20*n*. Extra game credits may be awarded for completion of multiple prespecified patterns 98 (e.g., more than one line).

In the matrix 90 of FIGS. 12-15, assignment of trivia topics 94 to randomly selected spaces 92 results in one horizontal line 98 and one diagonal 3-square topic-filled line 98 for play. The random assignment is shown as resulting in a random order of topics for which trivia questions are asked. In addition, the numbered trivia topics 94 may be played out of order, as randomly selected by the random number generator 200 (FIG. 1). As shown in the exemplary matrix 90 of FIG. 12, the topics 94 assigned to the squares 92 are:

| | |
|---|---|
| Topic 1: | Cities |
| Topic 2: | WWII |
| Topic 3: | Stars |
| Topic 4: | Colors |
| Topic 5: | College |
| Topic 6: | Phones |

The trivia topics 94 may be randomly selected form a predetermined set or selected by the player. For example, a scrollable list of topics 94 may be presented on-screen to a player upon entering the bonus event 20. The player selects a set of (e.g., six) trivia topics 94 from the list, and the random number generator 200 (FIG. 1) randomly assigns each of the selected topics to a particular number of spaces 92 for playing the trivia tic tac toe game.

FIG. 13 shows the exemplary matrix 90 following presentation of Topic 3, and a correct answer by the player. The correct answer indicia 88A is shown as an X.

Figure 14:
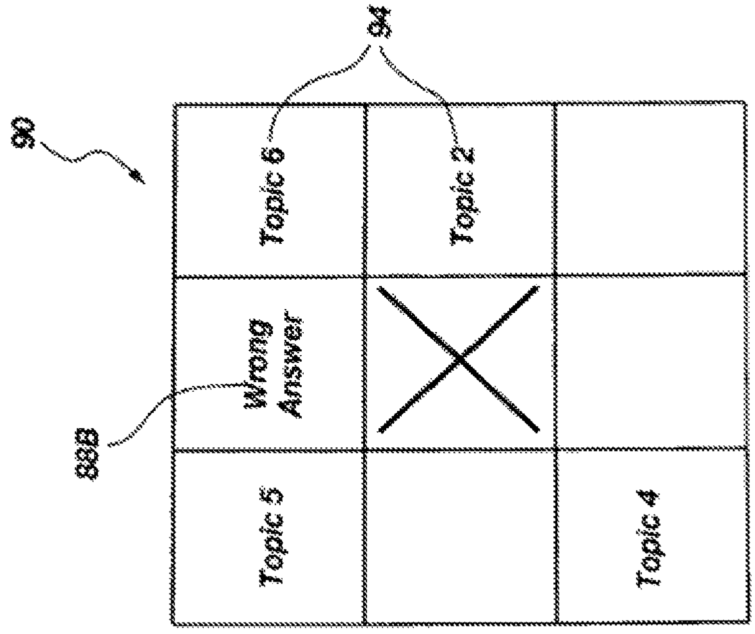

FIG. 14 shows the same matrix 90 following the selection of a wrong answer to a question concerning Topic 1. A wrong answer indicium 88B may be shown simply as the words "Wrong Answer".

Figure 15:
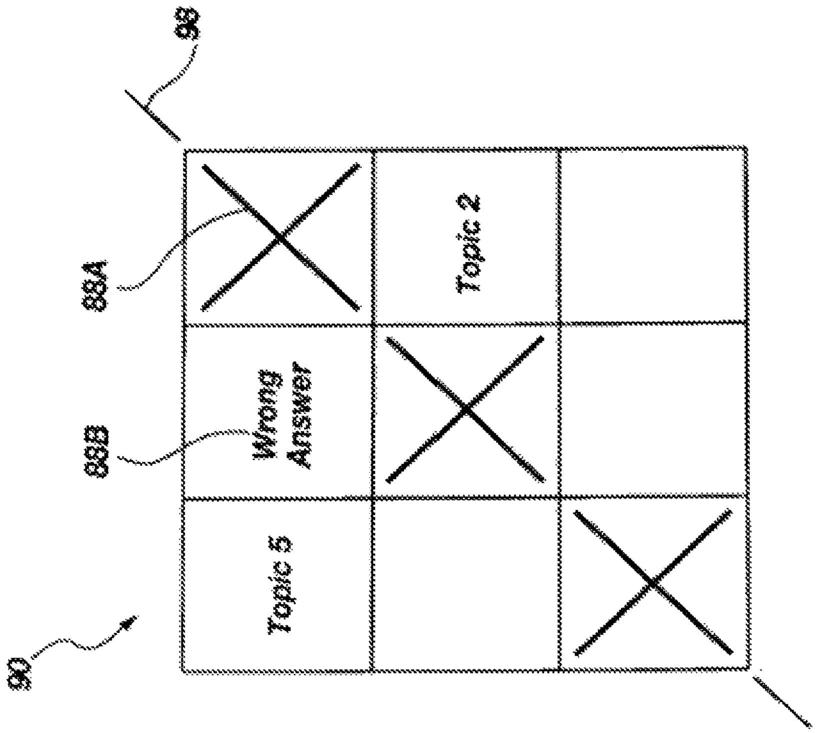

FIG. 15 depicts the same matrix 90 following a player's response to the first four questions. In addition to the correct answer to Topic 3, Topic 4 was also correctly answered. When the question for Topic 6, together with three possible answers, was displayed, the player presented a free pass to complete line 98, and was not required to answer the question. Completion of line 98 initiated entry into the next-higher bonus level 20B of the bonus event 20, sending play to an additional tic tac toe matrix 90.

Each additional level 20B, 20C . . . 20*n* of the bonus event 20 may comprise a matrix 90, trivia topics 94, trivia questions and answers similar to those of the initial level 20A (FIGS. 6, 6A) of the bonus event. In the example described herein, the second bonus level 20B is also the final level of the bonus event 20, the game being limited to a base game 10 and two bonus levels 20A and 20B.

Figure 7:
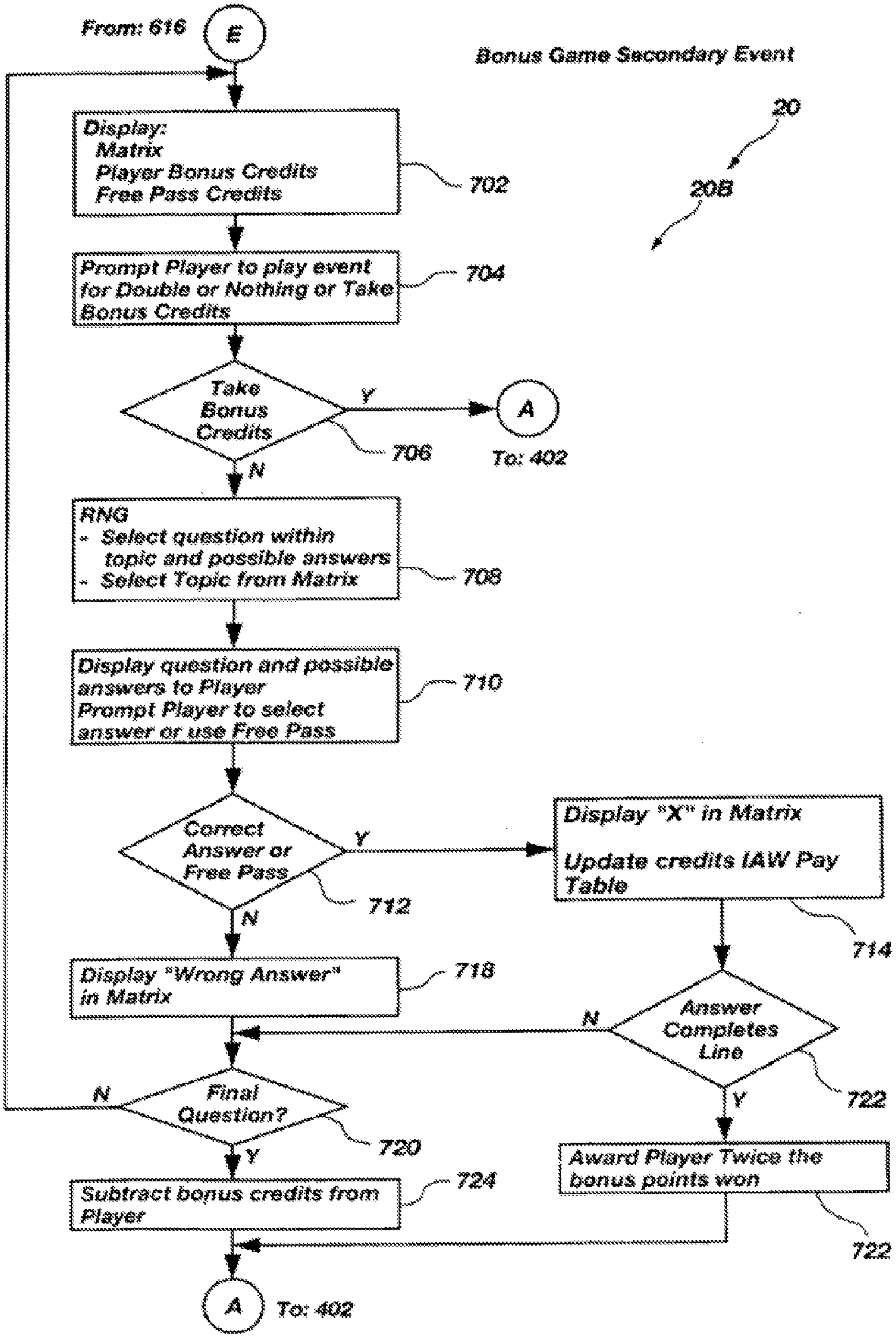

In the particular embodiment shown in FIG. 7, the final level 20B of the bonus event 20 comprises a "double or nothing" wager based on answering each of three trivia questions in a three-space line (an example of a preselected number of spaces 92 and space pattern 98) of a newly presented matrix 90. The play is similar to that of the first level 20A of the bonus event 20, as depicted in FIG. 6. Upon entering the second level 20B, game credits and free passes that have been accumulated on the gaming machine 100 (FIGS. 1 and 1A) are displayed thereby, at step 702. The player is then prompted, at step 704, to play the event for "Double or Nothing", or alternatively take the bonus awards without playing the second level 20B of the bonus event 20 (i.e., return to the base game 10). For example, the game may be configured so that the player receives a given number of game credits for attaining the second level 20B; these credits comprise the "pot" which is wagered for double or nothing, or alternatively taken without playing second level 20B. The game may be configured so that additional winnings or losses during play at the second level 20B may be added to the pot or wager.

If the player elects to play the final level 20B, at step 706, the random number generator 200 of the gaming machine 100 (FIG. 1) may select trivia topics 94, as well as their associated trivia questions and the possible answers that correspond to each trivia question at step 708 and the first trivia question to be answered is displayed on the gaming machine 100 at step 710. The random number generator 200 assigns the trivia topics 94 to particular spaces 92 of the displayed matrix 90 and, optionally, an order in which the trivia questions are to be presented or asked. Upon receiving a trivia question, the player selects an answer from the list of possible answers at step 712 and is awarded game credits or other awards (e.g., a free pass) for correct answers, at step 714. The high-resolution monitor 162 or display 178 of the gaming machine 100 (FIG. 1), also is updated at step 714 to reflect whether that the correct answer to the trivia question was presented. In the event that an incorrect answer has been selected, the high-resolution monitor 162 or display 178 is updated at step 718, to reflect that the incorrect answer to the trivia question was presented. If a player succeeds at completing the prespecified pattern 98 of spaces 92 at 722, the number of game credits that were accumulated during play of the bonus event 20 or the total number of game credits that were available to the player upon entry into the final bonus level of the bonus event 20 may be doubled, at step 722. Otherwise, an inquiry may then be made, at step 720, as to whether the final trivia question of level 20B has been asked and answered. If not, process proceeds back to step 702. If so, process flows to step 724. At step 724, like number of game credits may be decremented from the total number of accumulated game credits available on the gaming machine 100 to the player.

If, at step 706, the player chooses not to play the final level 20B, play of the base game 10 (FIG. 4) may resume, with any bonus game credits received being combined with other game credits that have been accumulated on gaming machine 100 (FIGS. 1 and 1A.)

Once a bonus award is made, it is logged onto a bonus credit meter or a consolidated award credit meter as known in the art, to either be retrieved by the player or used for further wagers, all as known in the art. If the payout is sufficiently large to require an IRS form W2G, the gaming machine preferably locks up and a signal is sent to central server computer 220 (FIG. 2) for reconciliation of the award.

The multilevel game as described has many configurations and optional features. It may be formed to incorporate electronic play at all levels, not requiring physical reels. It may be applied in a "top box" form in combination with a conventional electromechanical base game gaming machine. In such a configuration, it employs a visually perceptible representation, such as a video representation on a video display of bonus play and base play results. A keypad, either on the gaming machine housing (such as play input control 66 described in the context of FIG. 1A) or a portion of a touch screen on the gaming machine (such as touch screen 166 described in the context of FIGS. 1 and 1A) may be employed to input player decisions relating to bonus events.

In addition, the game of the present invention may be effected in a competitive environment, where two or more players compete with one another on a sequential basis (i.e., by taking turns) or based on a rate of play of the base game and qualification for the bonus event therein. One player may prevent another player from receiving a larger award or successfully completing a level 20A, 20B . . . 20*n* of the bonus event by correctly answering trivia questions that prevent the second (another) player from obtaining correct answer indicia 88A in a prespecified arrangement of spaces 92 of the matrix 90.

While the foregoing describes a game with a plurality of bonus levels, a simple form of the game may have a single base game and a bonus event with a single level of play. Alternatively, there may be multiple possible levels in the bonus event.

It will be recognized from the above description that the gaming device and game method of this invention enables a player to use mental skill in a regulated gaming environment, adding a great deal of interest and excitement to playing the game. As the gaming method of the present invention includes the effects of both chance and mental skill, as well as the possibility for entry from a base game into a bonus event, it is conducive to the use of attention-attracting video and audio effects.

While the present invention has been disclosed herein in terms of certain exemplary embodiments, those of ordinary skill in the art will recognize and appreciate that it is not so limited. Many additions, deletions and modifications to the disclosed embodiments may be effected without departing from the scope of the invention. Moreover, features from one embodiment may be combined with features from other embodiments. The scope of the instant invention is only to be limited by the claims which follow.

What is claimed is:

1. A gaming system comprising:

at least one display device;

at least one input device;

at least one processor; and at least one memory device storing a plurality of instructions which, when executed by the at least one processor, cause the at least one processor to operate with the at least one display device and the at least one input device to, for each play of a first game:

(a) receive a wager from a player;

(b) generate and display an outcome for said play of the first game;

(c) determine any awards based on said outcome;

(d) provide any determined awards;

(e) upon an occurrence of an accumulation event, accumulate a quantity of free passes usable in a second different type of game; and (f) upon an occurrence of a second game trigger, provide a play of the second different type of game and, for said play of the second different type of game:

(1) display a matrix including a plurality of designated spaces;

(2) for each of the plurality of designated spaces of the matrix, assign one of a plurality of different trivia topics to said designated space;

(3) display the respective assigned trivia topics in association with the designated spaces of said matrix;

(4) enable the player to select one of the plurality of designated spaces;

(5) after the player selects one of the designated spaces, randomly select a trivia question associated with the trivia topic associated with the selected designated space;

(6) display a plurality of possible answers to said randomly selected trivia question in association with a display of said randomly selected trivia question;

(7) enable the player to use one of any accumulated free passes in place of a correct answer to said randomly selected trivia question; and (8) provide the player with a monetary award if one of: (a) the player provides the correct answer to said randomly selected trivia question, and (b) the player uses the free pass in place of the correct answer to said randomly selected trivia question.

2. A gaming system comprising:

a plurality of gaming machines; and a controller configured to communicate with each gaming machine of the plurality of gaming machines, wherein the controller is configured to operate with the plurality of gaming machines to:

(1) for each gaming machine of the plurality of gaming machines, for each play of a first game on said gaming machine:

(a) receive a wager from a player of said gaming machine;

(b) generate and display an outcome for said play of the first game;

(c) determine any awards based on said outcome;

(d) provide any determined awards; and (e) upon an occurrence of an accumulation event, accumulate a quantity of free passes usable by said player in a second different type of game; and (2) if a second game triggering event occurs, for a play of the second different type of game:

(a) for each one of two or more of the plurality of gaming machines:

(i) randomly generate one of a plurality of different trivia questions, wherein the generated trivia question is associated with at least one correct answer and at least one incorrect answer;

(ii) cause at least one display device of said one of the two or more of the plurality of gaming machines to display the generated trivia question, the at least one correct answer and the at least one incorrect answer; and (iii) cause said one of the two or more of the plurality of gaming machines to enable the player of said one of the two or more of the plurality of gaming machines to select one of:

(A) the at least one displayed correct answer;
(B) the at least one displayed incorrect answer; and
(C) any free passes accumulated by said player from any plays of the first game in place of the at least one displayed correct answer;
(b) repeat step (2)(a) at least once; and
(c) display and provide a monetary award to at least one of, but not all of, the players of the two or more of the plurality of gaming machines, wherein said determination is based on any selected correct answers for the players and any selected free passes for the players.

3. The gaming system of claim 2, wherein the generated trivia question is from a randomly generated trivia topic.

4. The gaming system of claim 2, wherein steps (2)(a)(i) to (2)(a)(iii) are provided sequentially for the two or more of the plurality of gaming machines such that steps (2)(a)(i) to (2)(a)(iii) are provided: (I) for a first one of the two or more of the plurality of gaming machines; and (II) thereafter, for a second one of the two or more of the plurality of gaming machines.

5. The gaming system of claim 2, wherein steps (2)(a)(i) to (2)(a)(iii) are provided based on a rate of play for the two or more of the plurality of gaming machines such that steps (2)(a)(i) to (2)(a)(iii) are provided: (I) for a first one of the two or more of the plurality of gaming machines having a first rate of play; and (II) thereafter, for a second one of the two or more of the plurality of gaming machines having a second rate of play.

6. The gaming system of claim 2, wherein any accumulated free passes are stored in association with a player tracking system.

7. The gaming system of claim 2, wherein the controller is configured to cause each gaming machine of the plurality of gaming machines to enable the player of said gaming machine to purchase at least one free pass.

8. A gaming system comprising:
at least one display device;
at least one input device;
at least one processor; and
at least one memory device storing a plurality of instructions which, when executed by the at least one processor, cause the at least one processor to operate with the at least one display device and the at least one input device to, for each play of a first game:
(a) generate and display an outcome for said play of the first game;
(b) determine any awards based on said outcome;
(c) provide any determined awards;
(d) upon an occurrence of an accumulation event, accumulate a quantity of free passes usable in a second different type of game, the second different type of game including a plurality of trivia questions;
(e) determine if a predetermined event has occurred in said play of the first game;
(f) if the predetermined event has occurred in said play of the first game, enable a player to accept or reject a play of the second different type of game;
(g) if the player accepted the play of the second different type of game, display said play of the second different type of game, wherein any accumulated free passes are available for said play of the second different type of game to be used by the player in place of a correct answer to one of said plurality of trivia questions, and display and provide a monetary award to the player if one of: (i) the player provides the correct answer to said trivia question, and (ii) the player uses one of the accumulated free passes in place of the correct answer to said trivia question; and
(h) if the player rejected the play of the second different type of game, repeat steps (a) to (g) at least once.

9. The gaming system of claim 8, wherein if the player rejected the play of the second different type of game, any accumulated free passes for the second different type of game are stored for the player in association with a player tracking system.

10. The gaming system of claim 9, wherein at least one stored accumulated free pass is available for a different play of the second different type of game.

11. The gaming system of claim 8, wherein the plurality of instructions, when executed by the at least one processor, cause the at least one processor to operate with the at least one display device and the at least one input device to, when the player uses one of the accumulated free passes in the second different type of game in place of the correct answer, enable the player to advance in the second different type of game or provide monetary award as if the player had answered the trivia question correctly.

12. A gaming system comprising:
at least one display device;
at least one input device;
at least one processor; and
at least one memory device storing a plurality of instructions which, when executed by the at least one processor, cause the at least one processor to operate with the at least one display device and the at least one input device to, for each play of a first game:
(a) receive a wager from a player;
(b) generate and display an outcome for said play of the first game;
(c) determines any awards based on said outcome;
(d) provide any determined awards;
(e) upon an occurrence of an accumulation event, accumulate a quantity of free passes usable in second different type of game; and
(f) upon an occurrence of a second game triggering event, provide a play of the second different type of game and, for said play of the second different type of game:
(1) randomly assign and display one topic of a plurality of topics to each of a plurality of positions of a matrix, wherein said plurality of positions associated with one of said assigned topics is less than all of the positions of the matrix;
(2) pick one of the displayed topics;
(3) randomly generate and display a question associated with the picked topic, wherein the question includes a plurality of displayed answers and at least one of the displayed answers is a correct answer;
(4) enable the player to do one of:
(i) make an input to pick one of the displayed answers; and
(ii) make an input to redeem a free pass accumulated from any plays of the first game by said player in place of the correct answer; and
(5) repeat steps (b) to (d) until one of the following occurs:
(i) a monetary award is displayed and provided to the player for the player picking the correct answer, or redeeming the free pass in place of the correct answer, for a plurality of said topics assigned to positions of the matrix which form a predetermined pattern; and
(ii) each of the displayed topics has been picked at least once such that the random assignment of the topics to the positions of the matrix in step (a) prevents the formation of any predetermined patterns.

13. The gaming system of claim 12, wherein the plurality of instructions, when executed by the at least one processor, cause the at least one processor to operate with the at least one display device and the at least one input device to, when the player makes the input to redeem the free pass in place of the correct answer, enable the player to advance in the formation of the predetermined pattern or provide the monetary award as if the player had answered the question correctly.

* * * * *